March 15, 1932.  M. OKOCHI ET AL  1,849,467
METHOD OF MANUFACTURING PISTON RINGS
Filed April 19, 1927  4 Sheets-Sheet 1
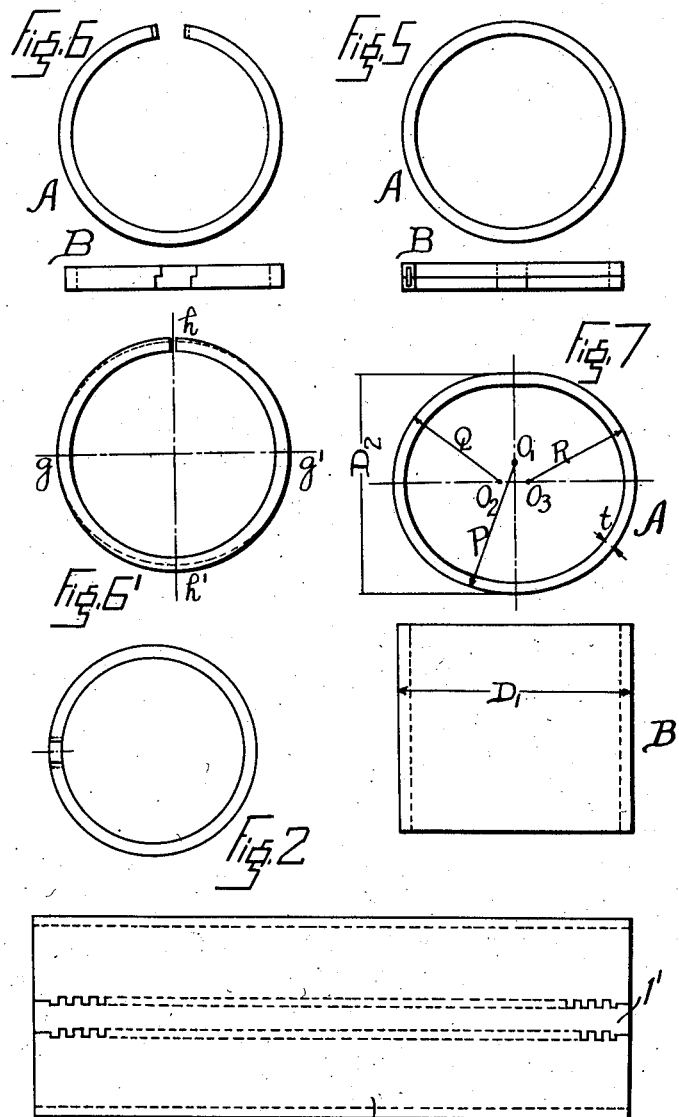
M. Okochi and
K. Ebihara
Inventors.

March 15, 1932.  M. OKOCHI ET AL  1,849,467
METHOD OF MANUFACTURING PISTON RINGS
Filed April 19, 1927  4 Sheets-Sheet 2
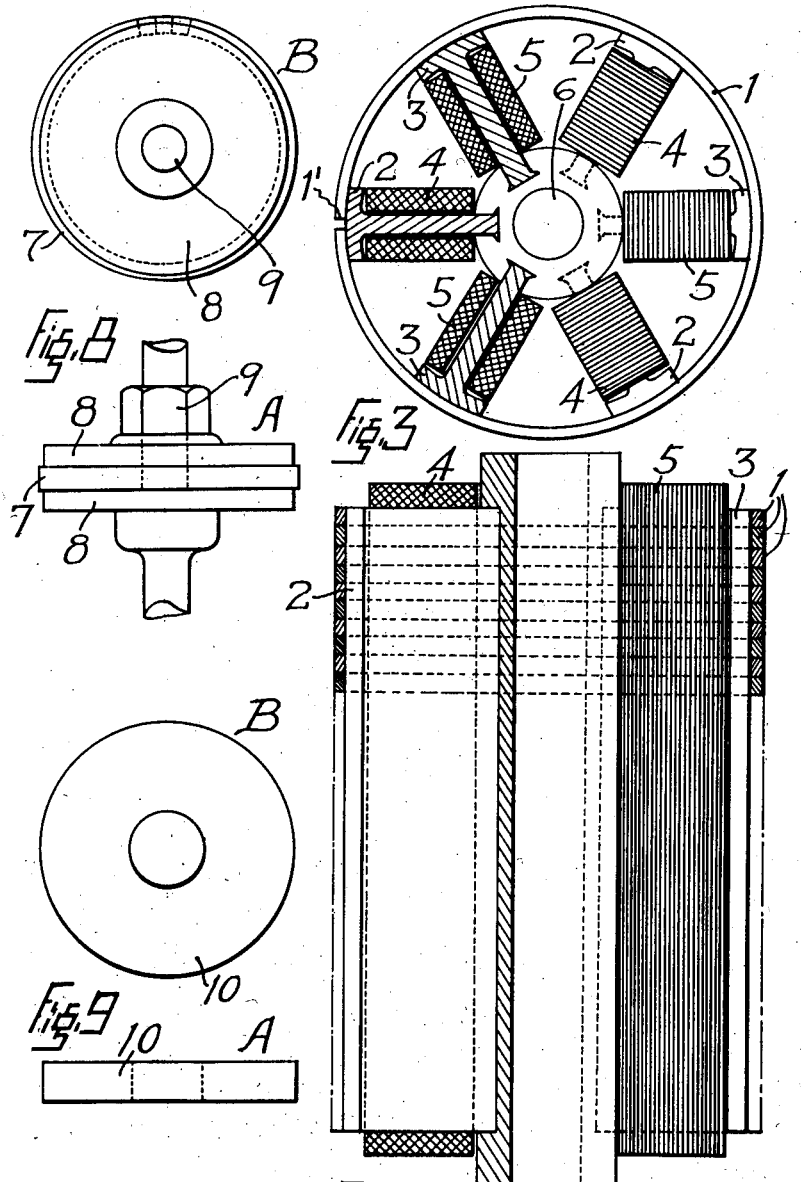
M. Okochi and
K. Ebihara
Inventors.
By Marks & Clark
Attorneys.

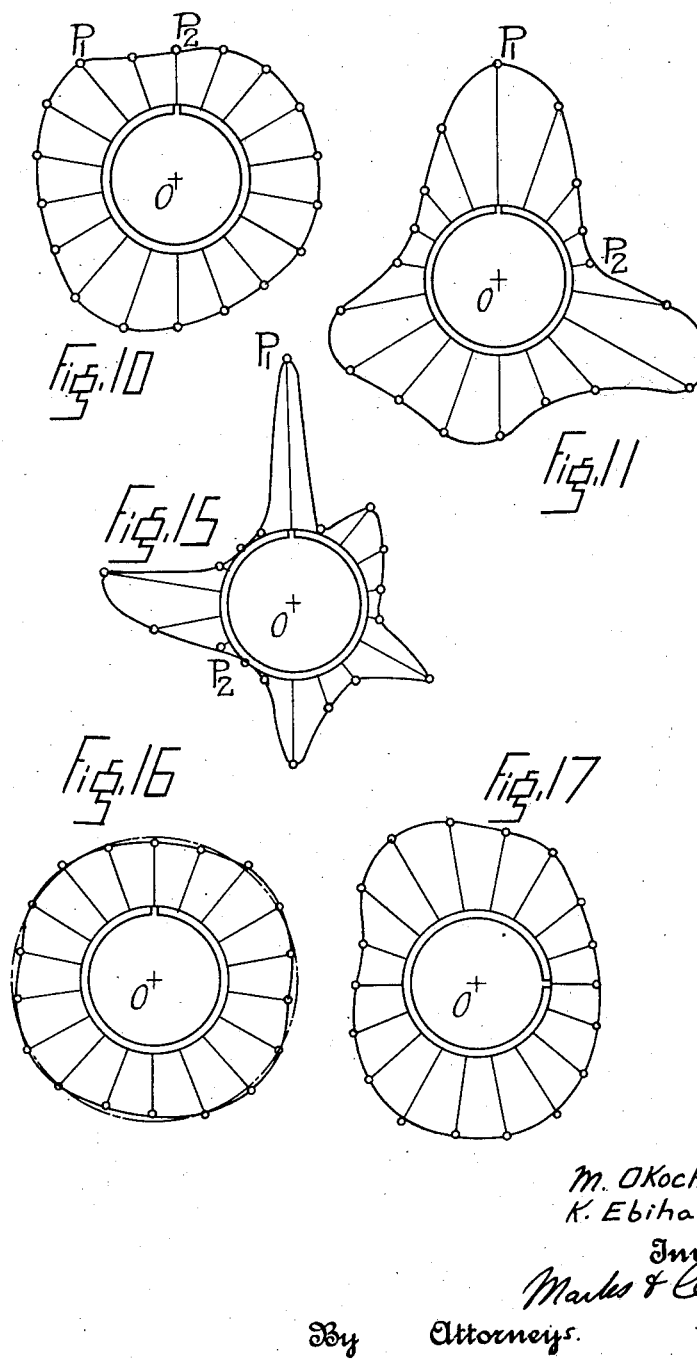

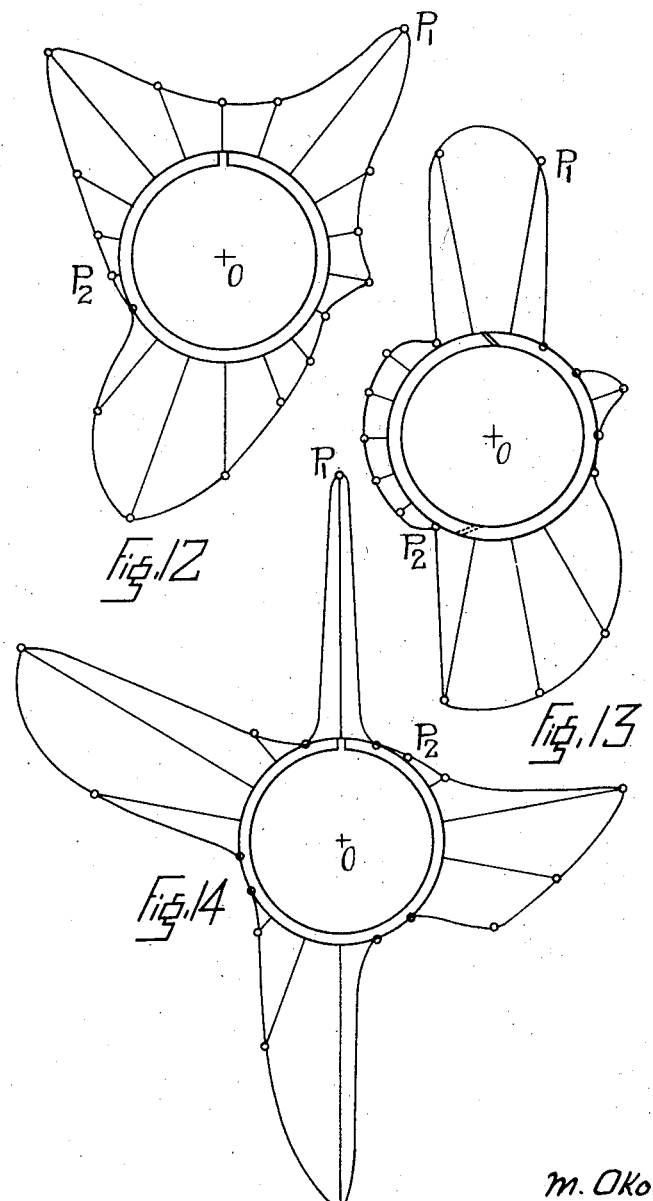

Patented Mar. 15, 1932                                              1,849,467

UNITED STATES PATENT OFFICE

MASATOSI OKOCHI, OF SHITAYA-KU, AND KEIKICHI EBIHARA, OF KOISHIKAWA-KU, TOKYO, JAPAN, ASSIGNORS TO ZAIDAN HOJIN RIKAGAKU KENKYUJO, OF TOKYO, JAPAN

METHOD OF MANUFACTURING PISTON RINGS

Application filed April 19, 1927, Serial No. 185,029, and in Japan May 12, 1926.

This invention relates to piston rings exerting uniformly distributed pressure against the wall of an engine cylinder and also a method of manufacturing the same. The object of the invention is a new method of manufacturing such piston rings, especially suitable for mass production, in a simple and easy manner.

The drawings illustrate how the invention is to be carried out, and in which Fig. 1 shows a cylindrical blank having a longitudinal opening, an example of one form of blank to be used in this method; Fig. 2 shows an end view thereof; Fig. 3 shows an end view of the cylindrical blank closed by a magnetic chuck; Fig. 4 shows a longitudinal section of a series of blank rings closed by a magnetic chuck; Fig. 5 shows one form of finished ring in which A is the plan, B the elevation; Fig. 6 shows another example of a finished ring, in which A is the plan, B an elevation; Fig. 6' shows a ring blank having an opening to illustrate the effect of the finishing operation; Fig. 7 shows a modified form of the cylindrical blank, in which A is a plan, B an elevation; Figs. 8 and 9 illustrate steps of a convenient method of preparing the modified blank ring, and in which Fig. 8 illustrates the first step thereof; A and B being side and plan views; Fig. 9 illustrates the second step thereof; A and B being side and plan views; Fig. 10 shows the pressure distributing curve of a piston ring according to this invention acting upon the inner wall of an engine cylinder, while Figs. 11 to 15 show the pressure distributing curves of the piston rings manufactured by usual method. Figs. 16 and 17 show respectively pressure curves of a single and a compound ring manufactured according to this invention.

In Fig. 1, 1 is a cylindrical blank from which piston rings are manufactured according to this invention. 1' is a longitudinal opening in the blank, the side walls of which are of zig-zag formation, the opening extending parallel to the longitudinal axis of the blank.

In the manufacture of the rings a cylindrical blank is chosen that is of somewhat greater diameter than the diameter of the cylinder of an engine in which the ring is to be used. Then the opening 1' is formed and the zig-zag wall is so arranged that the recesses in one side face the projection of the other side, so that when closed by means of the magnetic chuck as hereafter described, they can interfit with each other to make a completely closed cylindrical blank.

The form of the longitudinal opening of the blank is by no means the essential of the invention and it may be in the form of a longitudinal cutting having practically parallel walls which, when the opening is closed, will tightly abut against each other.

Now referring to Fig. 3, 1 is a blank annular cylinder which is open at 1'. 4 is a series of electro-magnets having north poles 2 at their outer ends. 5 is another series of electro-magnets arranged alternately to the electro-magnets 4 and having south poles 3 at their outer ends. This forms two series of electro-magnets having opposite polarity which are alternately arranged in radial directions and at equiangular distances along the inner periphery of the blank cylinder 1. Each of the electro-magnets is fixed to a common shaft 6 of magnetic material at its inner edge; this arrangement constitutes a magnetic chuck. The magnetic force of each of the electro-magnets is adjusted to be the same so that they will each attract the blank cylinder inwardly to close the opening 1' with the same attracting force and therefore the blank rings will be put in a condition the same as if they were compressed by a uniformly distributed force acting upon the outer periphery of the blank cylinder. After the outer surface of the blank cylinder, thus closed by the magnetic chuck is finished to a desired diameter by a machine such as a lathe or a grinder, the circuit of coils of the electro-magnets is cut and the blank cylinder can be easily taken off the magnetic chuck and cut transversely in planes perpendicular to its axis into rings of any desired breadth by convenient means. Such rings can be directly used as piston rings and they will exert a uniform pressure upon the inner wall of an engine cylinder. By arranging the electro-magnets on the shaft 6 so that the blank cylinder is concentric to the axis of the shaft a further centering is unnecessary when the work is fitted to a machine such as a lathe or a grinder, and a rapid production of piston rings can be easily achieved.

It is to be understood that instead of a hollow cylinder having a longitudinal opening parallel to the axis thereof a series of blank rings each having a similar opening can be used as shown in Fig. 4. In this case, the operation is quite the same as above described, and the rings can be finished to a desired diameter after the opening is closed by the magnetic chuck.

In the actual working of the invention, if the cylindrical blank is accurately cylindrical, it is slightly deformed into an oval form as shown in Fig. 6' when the opening of the blank is closed by the uniform internal attraction by the said magnetic chuck. As the outer wall of such oval cylinder is turned into true cylinder, the material taken off is greater in parts $h$, $h'$ than in parts $g$, $g'$. Therefore, when the piston rings are made of a truly cylindrical blank, they may be of varying thicknesses. In order to avoid such a defect, the cylindrical or ring blank is preferably made somewhat deformed from true cylindrical form. Referring to Fig. 7 which shows an example of such a blank from which piston rings are to be made for an engine cylinder of 127 mms. inner diameter and in which $P = 68.5$ mms.

$Q = R = 67.0$ mms.

Distance between $O_1$ and $O_2$ or $O_1$ and $O_3$ = 2.0 mms.

Distance between $O_2$ and $O_3$ = 3.0 mms.

Therefore, $D_1$ is greater than $D_2$ so that the form of the blank becomes slightly elliptical. The original thickness of the blank was 5 mms. which can be milled or ground down to 4 mms.

One of the simplest manners of forming a special cylindrical or ring blank of slightly elliptic form, as described with reference to Fig. 7, is to first manufacture a standard finished ring of uniform thickness from the same material as that of which the blank is to be made. This finished ring will have a slightly elliptical form when it is freed from any pressure closing the opening. Referring to Figs. 8 and 9, such a finished ring 7 of uniform thickness is clamped between two discs 8, 8 by means of bolts and nuts 9, so that no deformation of the ring is caused thereby. By using the outline of such fixed ring as a model, a model plate 10 of exactly the same size and shape thereto is manufactured and finally by using such model plate 10, the cylindrical or ring blank is turned to the same section as that of the model plate by a suitable machine of known type.

It is well known in manufacturing piston rings from a cylindrical blank of greater outer diameter by finishing the outer wall thereof into a true cylinder of the smaller or desired diameter and then cutting away the blank into individual rings. Therefore such steps in the prescribed operation is by no means the essential features of the applicant's invention. The essential feature of the invention is to close the open blank from which the ring is to be formed by means of a magnetic chuck exerting uniform attracting force around the inner circumference of the blank, and to turn it to a desired outer diameter. Of course, two or more of the new rings may be couple together to build up a compound ring and in this case the position of the openings of each ring are preferably displaced relative to each other.

Fig. 10 shows a pressure distribution curve of a piston ring according to the present invention, while Fig. 11 to Fig. 15 show those of piston rings of usual manufacture, the curves being obtained by use of a device for measuring piston ring pressure, and applied for U. S. patent application filed on 3rd of August, 1926, Serial No. 126,917. It will be clearly understood that the new piston ring exerts practically uniformly distributed pressure against the wall of the engine cylinder while piston rings manufactured by the usual process, exert very unequal pressure, the value of which greatly varies to the points of the peripherical run. Fig. 17 shows another example of a pressure distribution of a compound ring manufactured by the method of this invention, which is so arranged that the pressure curve of each ring mutually compensates possible unevenness of the pressure of each ring, to completely give uniform pressure as shown in Fig. 16.

Briefly, the invention consists of a new idea of closing an opened cylindrical blank or opened ring blank by means of a magnetic chuck so that the closing force employed and acting at the circumference of the blank is absolutely uniform. Under such condition the blanks are turned into the true cylindrical surface of the blank which fits against the inner wall of an engine cylinder, when closed by the cylindrical wall of the engine cylinder, the condition therein becomes quite the same as when closed by the magnetic chuck so that they exert uniform pressure against the engine cylinder.

Claims.

1. A process for making piston rings for cylinders of known diameter comprising forming a noncontinuous annular metal blank of a larger diameter than the bore of the cylinder, distorting such blank to a noncircular form, such that when the blank is compressed to close the opening therein a true circular annulus is formed, compressing said blank by equal forces exerted in radial directions of the blank throughout its extent, holding the blank in such compressed condition and milling the outer surface of said blank when so held to the proper size.

2. A process as claimed in claim 1 in which the non-circular form of the blank is that of an ellipse.

In testimony whereof we affix our signatures.

MASATOSI OKOCHI.
KEIKICHI EBIHARA.